(12) United States Patent
Mun et al.

(10) Patent No.: US 10,453,420 B2
(45) Date of Patent: *Oct. 22, 2019

(54) BASE FILM, LAMINATED STRUCTURE INCLUDING THE SAME, AND DISPLAY DEVICE

(71) Applicant: LG CHEM, LTD., Seoul (KR)

(72) Inventors: Jeong Wook Mun, Daejeon (KR); Jung Woo Kim, Daejeon (KR); Sung-Ho Chun, Daejeon (KR); Dai Seung Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 697 days.

This patent is subject to a terminal disclaimer.

(21) Appl. No.: 14/443,330

(22) PCT Filed: Sep. 29, 2014

(86) PCT No.: PCT/KR2014/009116
§ 371 (c)(1),
(2) Date: May 15, 2015

(87) PCT Pub. No.: WO2015/046993
PCT Pub. Date: Apr. 2, 2015

(65) Prior Publication Data
US 2015/0299841 A1 Oct. 22, 2015

(30) Foreign Application Priority Data

Sep. 30, 2013 (KR) .................. 10-2013-0116560
Sep. 26, 2014 (KR) .................. 10-2014-0129369

(51) Int. Cl.
*G09G 5/00* (2006.01)
*B32B 27/08* (2006.01)
*C08F 232/08* (2006.01)
*H01B 1/08* (2006.01)
*C08L 23/08* (2006.01)
*C08L 25/04* (2006.01)

(52) U.S. Cl.
CPC ............ *G09G 5/003* (2013.01); *B32B 27/08* (2013.01); *C08F 232/08* (2013.01); *C08L 23/0823* (2013.01); *C08L 25/04* (2013.01); *H01B 1/08* (2013.01)

(58) Field of Classification Search
CPC ....... C08F 232/08; C08F 238/00; G06F 3/047
See application file for complete search history.

(56) References Cited

U.S. PATENT DOCUMENTS

| 5,705,503 | A | 1/1998 | Goodall et al. |
| 8,008,415 | B2 | 8/2011 | Kim et al. |
| 8,163,860 | B2 | 4/2012 | Kaita et al. |
| 8,587,756 | B2 | 11/2013 | Sabae et al. |
| 2008/0176999 | A1* | 7/2008 | Tamai ............. C08F 257/02 525/63 |
| 2010/0010177 | A1* | 1/2010 | Choi ............. C07C 67/293 526/90 |

FOREIGN PATENT DOCUMENTS

| CN | 101641389 A | 2/2010 |
| CN | 101661129 A | 3/2010 |
| CN | 102300889 A | 12/2011 |
| JP | 2003196029 A | 7/2003 |
| JP | 2005521785 A | 7/2005 |
| JP | 2011-43628 A | 3/2011 |
| JP | 4991170 B2 | 8/2012 |
| JP | 2012-208502 A | 10/2012 |
| JP | 2013-054517 A | 3/2013 |
| KR | 10-0561068 B1 | 3/2006 |
| KR | 10-2006-0049922 A | 5/2006 |
| KR | 10-2008-0026944 A | 3/2008 |
| KR | 10-2008-0046572 A | 5/2008 |
| KR | 10-0873779 A | 12/2008 |
| KR | 10-0916085 B2 | 8/2009 |
| KR | 10-2010-0000064 A | 1/2010 |
| KR | 10-2010-0017796 A | 2/2010 |
| KR | 10-0955569 A | 4/2010 |
| KR | 10-2012-0005394 A | 1/2012 |
| WO | 2009084382 A1 | 9/2009 |
| WO | 2011/021805 A2 | 2/2011 |

OTHER PUBLICATIONS

Yu et al. "The effect of ITO films thickness on the properties of flexible organic light emitting diode". Optics Communications, 259 (2006); pp. 187-193.*

* cited by examiner

Primary Examiner — Prashant J Khatri
(74) Attorney, Agent, or Firm — Dentons US LLP (57) ABSTRACT

This disclosure relates to a base film, a laminated structure including the same, and a display device. More specifically, this disclosure relates to a base film that includes a polymer having a cyclic olefin-based repeat unit containing exo-isomers above a specific content and a copolymer including a styrene-based repeat unit and a maleimide-based repeat unit, exhibits a high glass transition temperature and thus has excellent heat resistance, and has high light transmittance, a laminated structure including the same, and a display device.

13 Claims, 1 Drawing Sheet

BASE FILM, LAMINATED STRUCTURE INCLUDING THE SAME, AND DISPLAY DEVICE

This application is a National Stage Entry of International Application No. PCT/KR2014/009116, filed on Sep. 29, 2014, and claims the benefit of Korean Application No. 10-2013-0116560, filed on Sep. 30, 2013, and Korean Application No. 10-2014-0129369, filed on Sep. 26, 2014, all of which are hereby incorporated by reference in their entirety.

TECHNICAL FIELD

The present invention relates to a base film, a laminated structure including the same, and a display device, and more particularly, to a base film that exhibits a high glass transition temperature and thus has excellent heat resistance, and has high light transmittance, a laminated structure including the same, and a display device.

BACKGROUND OF ART

In general, a touch panel is a device that is installed on the surface of a display device and converts physical contact such as a finger of a user, a touch pen, and the like into an electrical signal, and is applied for a liquid crystal display, a plasma display panel, an EL (electro-luminescence) device, and the like.

Such a touch panel is commercialized as an optical type using infrared rays, a transparent electrode type using a contact point of a transparent conductive film formed by coating a metal oxide on a polymer substrate film, a capacitance type detecting a change in capacity, a position sensitive type that senses a position from the distribution of force to a pressure sensor, and the like.

Among the various types of touch panels, a transparent electrode type requires a transparent metal oxide-based conductive film, and an ITO film formed by coating indium tin oxide (ITO) on a polymer substrate film is widely used because it is transparent and has excellent conductivity.

Particularly, the metal oxide-based conductive film may be prepared by vacuum deposition or sputtering a metal oxide on a polymer substrate film or a glass substrate. Thus, heat resistance is one of essential properties of a base film, because processes such as vacuum deposition, sputtering, and the like that are progressed at a high temperature should be conducted.

In general, heat resistance may be assessed by glass transition temperature, and to obtain a base film on which an optically excellent transparent metal oxide-based conductive film is formed, sputtering at a temperature of equal to or greater than about 150° C., preferably at a temperature of equal to or greater than about 200° C., is required, and thus a high glass transition temperature above the sputtering temperature and excellent mechanical properties are required for the base film.

Further, in order to process the base film and apply it to a display device and the like, transparency in the visible light region is also an important property in addition to the above-explained high glass transition temperature, and light transmittance of 90% or more is required.

However, a polymer film such as polyethylene terephthalate (PET), polyethylene naphthalate (PEN), polycarbonate (PC), and the like, which is conventionally used as a base film, has a low glass transition temperature of 120° C. or less, thus generating a problem of deformation in the process of forming a transparent metal oxide-based conductive film.

In addition, a polyimide (PI) film, on which many studies have recently being progressed due to its excellent heat resistance and high glass transition temperature of 400° C. or more, but is not transparent and shows an orange color, and thus is not suitable for application in the display field.

Further, since a polymer film such as polyethylene terephthalate (PET) and the like has a large phase difference, it can be used as an external base film, but cannot be used as an internal base film.

Accordingly, there is a demand for development of a base film that has properties of a high glass transition temperature, heat resistance, and the like, has small a phase difference, and is transparent, a laminated structure including the same, and a display device including the laminated structure.

DETAILED DESCRIPTION OF THE INVENTION

Technical Problem

It is an object of the invention to provide a base film that exhibits a high glass transition temperature and thus has excellent heat resistance, and has high light transmittance.

It is another object of the invention to provide a laminated structure including the base film.

It is still another object of the invention to provide a display device including the laminated structure.

Technical Solution

The present invention provides a base film including: a polymer having a cyclic olefin-based repeat unit; and a copolymer including a styrene-based repeat unit and a maleimide-based repeat unit, wherein the content of exo-isomers in the cyclic olefin-based repeat unit is 50 mol % or more, and a transparent metal oxide-based conductive film is formed on the base film.

The present invention also provides a laminated structure including the base film, and a transparent metal oxide-based conductive film formed on the base film.

The present invention also provides a display device including the laminated structure.

Hereinafter, a base film, a laminated structure including the same, and a display device according to specific embodiments of the invention will be explained in detail.

According to one embodiment of the invention, a base film is provided, including: a polymer having a cyclic olefin-based repeat unit; and a copolymer including a styrene-based repeat unit and a maleimide-based repeat unit, wherein the content of exo-isomers in the cyclic olefin-based repeat unit is 50 mol % or more, and a transparent metal oxide-based conductive film is formed on the base film.

In the base film, the cyclic olefin-based repeat unit may be represented by the following Formula 1, and the polymer having a cyclic olefin-based repeat unit may include a homopolymer prepared by addition polymerization of one kind of norbornene-based monomers represented by the following Chemical Formula 2, or a copolymer prepared by addition polymerization of two or more kinds thereof

[Chemical Formula 1]

[Chemical Formula 2]

In the Chemical Formulae 1 and 2, q is an integer of 0 to 4, m is 50 to 5000,

R1 to R4 are independently a polymer functional group or a non-polar functional group, or at least one combination selected from the group consisting of R1 and R2, and R3 and R4 may be connected to each other to form a C1-10 alkylidene group, or R1 or R2 may be connected with one of R3 and R4 to form a C4-12 saturated or unsaturated aliphatic ring or a C6-24 aromatic ring.

The inventors progressed studies on a base film that has properties of high glass transition temperature, heat resistance, transparency, and the like, and can be applied in the field of displays, particularly as a base film including a transparent metal oxide-based conductive film formed on the top, and confirmed through experiments that if a base film includes a polymer having a cyclic olefin-based repeat unit and a copolymer including a styrene-based repeat unit and a maleimide-based repeat unit, and the content of exo-isomers in the cyclic olefin-based repeat unit is 50 mol % or more, a film that has a high glass transition temperature and exhibits high light transmittance in the visible light region may be prepared, and completed the invention.

Particularly, the base film includes a polymer having a cyclic olefin-based repeat unit, for example, a norbornene-based repeat unit, thus exhibiting a high glass transition temperature, and includes 50 mol % or more of exo-isomers in the cyclic olefin-based repeat unit, thus exhibiting high light transmittance and transparency.

The base film includes a copolymer including a styrene-based repeat unit and a maleimide-based repeat unit together with the polymer having a cyclic olefin-based repeat unit, thus lowering a phase difference in the thickness direction.

The base film of one embodiment may include 50 mol % or more, or 50 to 100 mol %, of exo-isomers in the cyclic olefin-based repeat unit. The exo-isomers in the cyclic olefin-based repeat unit are characterized in that the molecular weight and yield increase when polymerized, the removal of a catalyst after a reaction is easy, and particularly, a remaining catalyst amount is low and thus heat resistance is excellent, and has high solubility in a solvent, and thus a base film including an excessive amount of exo-isomers compared to endo-isomers may exhibit high heat resistance and high transparency.

The polymer having a cyclic olefin-based repeat unit may have a weight average molecular weight of about 10,000 to 1,000,000, preferably about 200,000 to 500,000. The repeat unit of the Chemical Formula 1 making up the polymer having a cyclic olefin-based repeat unit may have a polymerization degree of about 30 to 5000, preferably about 300 to 1500.

The base film of one embodiment may include a copolymer including a styrene-based repeat unit and a maleimide-based repeat unit, and the copolymer may include 1 to 50 wt %, preferably 5 to 20 wt %, of the styrene-based repeat units. The copolymer including a styrene-based repeat unit and a maleimide-based repeat unit may inhibit lamination of molecules in the thickness direction, thus lowering a phase difference in the thickness direction while maintaining a phase difference in the plane direction. Particularly, since it appears that the styrene-based repeat unit in the copolymer performs a function for controlling the phase difference of the copolymer, if the content of the styrene-based repeat units in the copolymer is too small, the above-explained effect may not be sufficiently manifested.

The copolymer including a styrene-based repeat unit and a maleimide-based repeat unit may have a weight average molecular weight of about 500 to 1,000,000.

Further, the polymer having a cyclic olefin-based repeat unit and the copolymer including a styrene-based repeat unit and a maleimide-based repeat unit may be mixed at a weight ratio of 99:1 to 50:50, and preferably at a weight ratio of 90:10 to 70:30.

In the Chemical Formulas 1 and 2, the non-polar functional group may be selected from the group consisting of hydrogen, a halogen; a substituted or unsubstituted C1-20 linear or branched alkyl, a substituted or unsubstituted C2-20 linear or branched alkenyl, a substituted or unsubstituted C2-20 linear or branched alkynyl, a substituted or unsubstituted C3-12 cycloalkyl, a C6-40 aryl, and a substituted or unsubstituted C7-15 aralkyl.

The polar functional group may include at least one atom selected from the group consisting of oxygen, nitrogen, phosphorous, sulfur, silicon, and boron, and particularly, it may be selected from the group consisting of the following functional groups:

—$R_5OR_6$, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

-continued

In the polar functional group, p is independently an integer of 1 to 10; R5 may be selected from the group consisting of a substituted or unsubstituted C1-20 linear or branched alkylene, a substituted or unsubstituted C2-20 linear or branched alkenylene, a substituted or unsubstituted C2-20 linear or branched alkynylene, a substituted or unsubstituted C3-12 cycloalkylene, a substituted or unsubstituted C6-40 arylene, a substituted or unsubstituted C7-15 aralkylene, a substituted or unsubstituted C1-20 alkoxylene, and a substituted or unsubstituted C1-20 carbonyloxylene; and R6, R7, and R8 may be independently selected from the group consisting of hydrogen, q halogen, a substituted or unsubstituted C1-20 linear or branched alkyl, a substituted or unsubstituted C2-20 linear or branched alkenyl, a substituted or unsubstituted C2-20 linear or branched alkynyl, a substituted or unsubstituted C3-12 cycloalkyl, a substituted or unsubstituted C6-40 aryl, a substituted or unsubstituted C7-15 aralkyl, a substituted or unsubstituted C1-20 alkoxy, and a substituted or unsubstituted C1-20 carbonyloxy.

In the structure of the above-explained cyclic olefin compound, specific meaning of each substituent is as follows:

First, "alkyl" means a linear or branched saturated monovalent hydrocarbon moiety having 1 to 20, preferably 1 to 10, carbon atoms. The alkyl group may include those substituted with specific substituents described below as well as those unsubstituted. Examples of the alkyl group may include methyl, ethyl, propyl, 2-propyl, n-butyl, isobutyl, tert-butyl, pentyl, hexyl, dodecyl, fluoromethyl, difluoromethyl, trifluoromethyl, chloromethyl, dichloromethyl, trichloromethyl, iodomethyl, bromomethyl, and the like.

The term "alkenyl" means a linear or branched monovalent hydrocarbon moiety having 2 to 20, preferably 2 to 10, carbon atoms, including at least one carbon-carbon double bond. The alkenyl group may be bonded through a carbon atom including a carbon-carbon double bond or a saturated carbon atom. The alkenyl group may include those substituted with specific substituents described below as well as those unsubstituted. Examples of the alkenyl group may include ethenyl, 1-propenyl, 2-propenyl, 2-butenyl, 3-butenyl, pentenyl, 5-hexenyl, dodecenyl, and the like.

The term "cycloalkyl" means a saturated or unsaturated non-aromatic monovalent monocyclic, bicyclic, or tricyclic hydrocarbon moiety having 3 to 20 carbon atoms, and it may include those substituted with specific substituents described below. Examples of the cycloalkyl group may include cyclopropyl, cyclobutyl, cyclopentyl, cyclopentenyl, cyclohexyl, cyclohexenyl, cycloheptyl, cyclooctyl, decahydronaphthalenyl, adamantanyl, norbornyl (i.e., bicycle[2,2,2]hept-2-enyl), and the like.

The term "aryl" means a monovalent monocyclic, bicyclic, or tricyclic aromatic hydrocarbon moiety having 6 to 40, preferably 6 to 12, ring members, and it may include those substituted with specific substituents described below. Examples of the acryl group may include phenyl, naphthalenyl, fluorenyl, and the like.

The term "alkoxyaryl" means the above-defined aryl group, at least one hydrogen atom of which is substituted with an alkoxy group. Examples of the alkoxyaryl group may include methoxyphenyl, ethoxyphenyl, propoxyphenyl, butoxyphenyl, pentoxyphenyl, hexoxyphenyl, heptoxy, octoxy, nanoxy, methoxybiphenyl, methoxynaphthalenyl, methoxyfluorenyl, methoxyanthracenyl, and the like.

The term "aralkyl" means the above-defined alkyl group, at least one hydrogen atom of which is substituted with an aryl group, and it may include those substituted with specific substituents described below. Examples of the aralkyl group may include benzyl, benzhydryl, trityl, and the like.

The term "alkynyl" means a linear or branched monovalent hydrocarbon moiety having 2 to 20, preferably 2 to 10, more preferably 2 to 5, carbon atoms, including at least one carbon-carbon triple bond. The alkynyl group may be bonded through a carbon atom including a carbon-carbon triple bond or a saturated carbon atom. The alkynyl group may include those substituted with specific substituents described below. Examples of the alkynyl group may include ethylnyl, propynyl, and the like.

The term "alkylene" means a linear or branched saturated divalent hydrocarbon moiety having 1 to 20, preferably 1 to 10, more preferably 1 to 6, carbon atoms. Examples of the alkylene group may include methylene, ethylene, propylene, butylenes, hexylene, and the like.

The term "alkenylene" means a linear or branched divalent hydrocarbon moiety having 2 to 20, preferably 2 to 10, more preferably 2 to 6, carbon atoms, including at least one carbon-carbon double bond. The alkenylene group may be bonded through a carbon atom including a carbon-carbon double bond and/or a saturated carbon atom. The alkenylene group may include those substituted with specific substituents described below.

The term "cycloalkylene" means a saturated or unsaturated non-aromatic divalent monocyclic, bicyclic, or tricyclic hydrocarbon moiety of 3 to 12 carbon atoms, and it may include those substituted with specific substituents described below. Examples of the cycloalkylene group may include cyclopropylene, cyclobutylene, and the like.

The term "arylene" means a divalent monocyclic, bicyclic, or tricyclic aromatic hydrocarbon moiety having 6 to 20, preferably 6 to 12, ring members, and it may include those substituted with specific substituents described below. The aromatic moiety includes only carbon atoms. Examples of the arylene group may include phenylene and the like.

The term "aralkylene" means a divalent moiety of the above-defined alkylene group, at least one hydrogen atom of which is substituted with an aryl group, and it may include those substituted with specific substituents described below. Examples of the aralkylene group may include benzylene and the like.

The term "alkynylene" means a linear or branched divalent hydrocarbon moiety having 2 to 20, preferably 2 to 10, more preferably 2 to 6, carbon atoms, including at least one carbon-carbon triple bond. The alkynylene group may be bonded through a carbon atom including a carbon-carbon triple bond or a saturated carbon atom. It may include those substituted with specific substituents described below. Examples of the alkynylene group may include ethynylene, propynylene, and the like.

The term "alkylidene group" may be represented by $=CR^1R^2$, and it may be connected with a norbornene ring by a double bond, wherein $R^1$ and $R^2$ are independently a hydrocarbon group, and specifically, may be a non-polar functional group or a polar functional group explained above.

The expression that a substituent is "substituted or unsubstituted" means including each substituent itself and those substituted with a specific substituent. As used herein, unless otherwise defined, examples of the substituents with which each substituent may be further substituted may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, or polar functional groups including oxygen, nitrogen, phosphorous, sulfur, silicon, or boron as explained above, and the like.

Although the polymer having a cyclic olefin-based repeat unit may include only a cyclic olefin-based repeat unit, it may be a copolymer further including a different kind of repeat units besides the cyclic olefin-based repeat unit. Examples of the different kind of repeat units may include any olefin-based repeat unit, an acrylate-based repeat unit, a cyclic olefin-based repeat unit, and the like.

In the base film of one embodiment, the norbornene monomer represented by the Chemical Formula 2 may preferably include at least one kind of monomer selected from the group consisting of a monomer containing a carboxylic acid alkyl ester functional group, a monomer containing a polar functional group, a monomer containing an acetate group, a monomer containing an alkyl group, and a monomer containing an aryl group.

More specifically, examples of the monomer containing a carboxylic acid alkyl ester functional group may include 5-norbornene-2-carboxylic acid methyl ester, 5-norbornene-2-carboxylic acid ethyl ester, 5-norbornene-2-carboxylic acid butyl ester, 5-norbornene-2-carboxylic acid isobornyl ester and the like; examples of the monomer containing a polar functional group may include 5-norbornene-2-carboxylic acid hydroxy ethyl ester and the like; examples of the monomer containing an acetate group may include 5-norbornene-2-methyl acetate and the like; examples of the monomer containing an alkyl group may include 5-butyl-2-norbornene and the like; and examples of the monomer containing an aryl group may include 5-phenyl-2-norbornene and the like.

Since the norbornene-based monomers have an ester-based substituent, the monomer may include an electron withdrawing group (EWG). Thus, the base film including a norbornene-based monomer according to one embodiment may exhibit excellent adhesion to other films, particularly to an ITO film.

The styrene-based repeat unit of the copolymer including a styrene-based repeat unit and a maleimide-based repeat unit may be a repeat unit derived from a compound selected from the group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene, and preferably, it may be styrene or 4-hydroxystyrene.

The maleimide-based repeat unit may be a repeat unit derived from a compound selected from the group consisting of (R)-(+)-N-(1-phenylethyl)maleimide, (S)-(−)-N-(1-phenylethyl)maleimide, 1,1'-(methylenedi-4,1-phenylene)bis-maleimide, 1-(2-methoxy-5-methylphenyl)maleimide, 2,3-dibromo-N-methylmaleimide, 2,3-dibromomaleimide, 22,3-dichloro-N-phenylmaleimide, 2-methyl-N-phenylmaleimide, 4-dimethylaminophenylazophenyl-4'-maleimide, biotin-maleimide, bisindolylmaleimide I hydrochloride, bisindolylmaleimide II, bisindolylmaleimide IV, bisindolylmaleimide V, bisindolylmaleimide VII, bisindolylmaleimide VIII, acetate, bisindolylmaleimide X, hydrochloride, bisindolylmaleimide XI, fluorescein diacetate 5-maleimide, maleimide, N,N'-(o-phenylene)dimaleimide, N,N'-(p-phenylene)dimaleimide, N,N'-1,2-phenylenedimaleimide, N,N'-1,3-phenylenedimaleimide, N,N'-1,4-phenylenedimaleimide, N-(1-naphthyl)-maleimide, N-(1-pyrenyl)maleimide, N-(2,3-xylyl)maleimide, an N-(2-aminoethyl)maleimide trifluoroacetate salt, N-(2-ethylphenyl)maleimide, N-(2-methoxyphenyl)maleimide, N-(3-fluoranthyl)maleimide, N-(3-methoxyphenyl)maleimide, N-(4-anilino-1-naphthyl)maleimide, N-(4-chlorophenyl)-maleimide, N-(4-ethylphenyl)maleimide, N-(4-fluorophenyl)maleimide, N-(4-iodophenyl)maleimide, N-(4-nitrophenyl)maleimide, N-(4-phenoxyphenyl)maleimide, N-(7-dimethylamino-4-methyl-3-coumarinyl)maleimide, N-(7-dimethylamino-4-methylcoumarin-3-yl)-maleimide), N-(9-acridinyl)maleimide, N-(ortho-tolyl)-maleimide, N-(para-tolyl)-maleimide, N-benzyl-2,3-dibromomaleimide, N-benzylmaleimide, N-butylmaleimide, N-cyclohexylmaleimide, N-ethylmaleimide, N-hydroxymaleimide, N-methoxycarbonylmaleimide, N-methylmaleimide, N-phenylmaleimide, N-propylmaleimide, N-tert-butylmaleimide, N-[4-(2-benzimidazolyl)phenyl]maleimide, and streptavidin-maleimide, and preferably, it may be maleic anhydride.

The base film according to one embodiment including a polymer having a cyclic olefin-based repeat unit, and a copolymer including a styrene-based repeat unit and a maleimide-based repeat unit, may have a glass transition temperature (Tg) of about 250° C. or more, about 250 to about 450° C., about 250 to 400° C., or about 300 to about 350° C. That is, the base film is an amorphous polymer with a hard and bulky ring structure in all the monomer units of the main chain, and thus is structurally hard. The base film includes 50 mol % or more of exo-isomers in the cyclic olefin-based repeat units, and thus exhibits a glass transition temperature of about 250° C. or more, preferably a high glass transition temperature of about 250 to 450° C., thereby exhibiting superior thermal stability compared to the previously known base films such as polyethylene terephthalate (PET), polyethylene naphthalate (PEN), polycarbonate (PC), and the like.

The base film may have light transmittance of 90% or more at a wavelength region of about 400 to 800 nm. Since the base film of one embodiment includes a cyclic olefin-based polymer obtained by addition polymerization using a homogeneous catalyst and thus has a hard and bulky ring structure in all the monomer units of the main chain, it does not generate optical loss due to scattering, and has small light absorption in the visible light region due to i-conjugation, thus exhibiting high light transmittance.

Particularly, the base film has a low dielectric constant, electrically excellent isotropy, and a small phase difference ($R_{th}$) in the thickness direction, and thus it may be applied for a base film of the inside as well as the outside, when used for a display device.

The base film may have a thickness of 20 to 200 μm, and preferably 20 to 60 μm.

The transparent metal oxide-based conductive film formed on the top of the base film of one embodiment may be an ITO film, an ATO film, an IZO (indium zinc oxide) film, an indium film, a tin oxide film, a zinc oxide film, a titanium oxide film, an antimony oxide film, and the like. The transparent metal oxide-based conductive film may be formed, for example, by sputtering at a high temperature, but the kind and the preparation method are not limited thereto.

The base film may be used for a base of an ITO film for a touch panel or a base of a display device.

The base film may be prepared using commonly known constituents and preparation methods of a film, except including a polymer having a cyclic olefin-based repeat unit and a copolymer including a styrene-based repeat unit and a maleimide-based repeat unit as explained above.

For example, 10 to 30 wt % of the polymer having a cyclic olefin-based repeat unit and the copolymer including a styrene-based repeat unit and a maleimide-based repeat unit, and the remaining amount of solvent, are mixed to prepared a coating solution, which is casted on a mirror surface-polished substrate such as metal or glass using a knife coater or a bar coater, and then the solvent is dried to prepare a base film. The drying temperature may be selected according to the kind of solvent used, and the surface temperature of the mirror surface-polished substrate such as metal or glass may be preferably below room temperature.

The solvent is not specifically limited, and for example, it may include cyclic saturated hydrocarbons such as cyclohexane, cycloheptane, cyclooctane, and the like; aromatic hydrocarbons such as benzene, toluene, xylene, ethylbenzene, cumene, and the like; halogenated alkanes or halogenated aryls such as chlorobutane, bromohexane, chloromethylene, dichloroethane, chlorobenzene, chloroform, tetrachloroethylene, and the like; saturated carboxylic acid esters such as ethyl acetate, n-butyl acetate, methyl propionate, and the like; ethers such as dibutylether, tetrahydrofuran, and the like; and alcohols such as methanol, ethanol, and the like, which may be used alone or in combination. Alkanes such as pentane, hexane, octane, nonane, decane, and the like may be additionally mixed with the solvent and used.

According to another embodiment of the invention, a laminated structure including the above explained base film, and a transparent metal oxide-based conductive film formed on the base film, are provided.

As explained above, since the base film includes a polymer having a cyclic olefin-based repeat unit and a copolymer including a styrene-based repeat unit and a maleimide-based repeat unit, includes 50 mol % or more of exo-isomers in the cyclic olefin-based repeat unit and thus has high glass transition temperature, and exhibits high light transmittance in the visible light region, the laminated structure including the base film and a transparent metal oxide-based conductive film may exhibit excellent heat resistance and transparency, and may be applied for a display device and the like.

Those described with regard to the base film of one embodiment may be applied to the base film and the transparent metal oxide-based conductive film formed on the base film without limitations.

According to yet another embodiment of the invention, a display device including the above-explained laminated structure is provided.

As explained above, since the laminated structure including a base film and a transparent metal oxide-based conductive film includes a polymer having a specific repeat unit and a copolymer including a styrene repeat unit and a maleimide repeat unit, and includes 50 mol % or more of exo-isomers in the specific repeat unit and thus exhibits excellent heat resistance and transparency, it may be appropriately applied for a display device.

Since the construction of the display device is identical to the common construction of a device except for including a base film including a polymer having a cyclic olefin-based repeat unit and a copolymer including a styrene-based repeat unit and a maleimide-based repeat unit as explained above, detailed explanations thereof are omitted.

Advantageous Effects

According to the present invention, a base film that exhibits a high glass transition temperature and thus has excellent heat resistance, and has high light transmittance, a laminated structure including the same, and a display device are provided.

DETAILED DESCRIPTION OF THE EMBODIMENTS

The present invention will be explained in detail with reference to the following examples. However, these examples are only to illustrate the invention, and the scope of the invention is not limited thereto.

EXAMPLES AND COMPARATIVE EXAMPLES: PREPARATION OF A CYCLIC OLEFIN-BASED POLYMER AND A BASE FILM

Example 1

(1) Preparation of a Cyclic Olefin-Based Polymer 5-norbornene-2-carboxylic acid butyl ester (100 g) with an exo ratio of 71 mol % and 5-norbornene-2-carboxylic acid methyl ester (900 g) with an exo ratio of 71 mol % were introduced into a reactor at room temperature, and toluene (3000 g) was put therein. 1-octyne (10.8 g) was additionally put in the reactor, the inside of the reactor was replaced with nitrogen, and then the temperature of the reactor was raised to 105° C. Subsequently, a catalyst of palladium acetate trimer (0.288 g) and tricyclohexyl phosphonium tetrakis (pentafluorophenyl) borate (2.46 g) were dissolved in a dichloromethane solvent, which was then introduced into the reactor, and reacted for 18 hours while stirring. After the reaction for 18 hours, a white polymer precipitate was obtained using acetone and ethanol. The precipitate was filtered with a filter to recover a polymer, which was dried in a vacuum oven at 60° C. for 24 hours to prepare a copolymer of 5-norbornene-2-carboxylic acid butyl ester and 5-norbornene-2-carboxylic acid methyl ester.

(2) Preparation of a Base Film 80 wt % of the copolymer of 5-norbornene-2-carboxylic acid butyl ester and 5-norbornene-2-carboxylic acid methyl ester obtained in (1) and 20 wt % of a styrene-maleimide copolymer having a maleimide monomer content of 15 wt % were mixed and dissolved in a methylene chloride (MC) solvent such that the solid content became 20 wt %. The solution was cleanly filtered using a filter having 0.45 µm pores to prepare a coating solution.

The coating solution was casted on a glass substrate using a knife coater or a bar coater, and then dried at room temperature for 1 hour, and dried again at 100° C. for 1 hour under a nitrogen atmosphere. After the drying, it was immersed in water for 30 seconds, and then a film on the glass substrate was delaminated to obtain a transparent film with a uniform thickness having a thickness deviation of less than 2%. The thickness, light transmittance at 400 to 800 nm, and glass transition temperature of the prepared film are shown in the following Table 1.

Examples 2 to 5 and Comparative Examples 1 to 2

A copolymer of 5-norbornene-2-carboxylic acid butyl ester and 5-norbornene-2-carboxylic acid methyl ester was prepared by the same method as Example 1, except that the contents of 5-norbornene-2-carboxylic acid butyl ester and 5-norbornene-2-carboxylic acid methyl ester and the ratio of exo were changed as shown in the following Table 1.

The above-prepared cyclic olefin-based polymer and a styrene-maleimide copolymer having a maleimide monomer content of 15 wt % were mixed at a ratio shown in Table 1 to prepare a transparent film.

TABLE 1

|  | Cyclic olefin based polymer ||||| Styrene-maleimide copolymer (wt %) |
|---|---|---|---|---|---|---|
|  | 5-norbornene-2-carboxylic acid methylester || 5-norbornene-2-carboxylic acid butyl ester |||  |
|  | content (g) | exo (mol %) | content (g) | exo (mol %) | content (wt %) |  |
| Example 1 | 900 | 71 | 100 | 71 | 80 | 20 |
| Example 2 | 900 | 71 | 100 | 71 | 70 | 30 |
| Example 3 | 700 | 71 | 300 | 71 | 80 | 20 |
| Example 4 | 700 | 71 | 300 | 71 | 70 | 30 |
| Example 5 | 0 | — | 1000 | 71 | 95 | 5 |
| Comparative Example 1 | 900 | 27 | 100 | 27 | 80 | 20 |
| Comparative Example 2 | 700 | 27 | 300 | 27 | 80 | 20 |

Experimental Example 1: Measurement of Physical Properties

The physical properties of each base film prepared in Examples 1 to 5 and Comparative Examples 1 and 2 were measured as follows, and the results are shown in the following Table 2.

(1) Measurement of Phase Difference

The phase difference of each base film obtained in the examples was measured using Axoscan (manufactured by Axomatrix Co. Ltd.), and the thickness of the film was measured together.

Herein, a phase difference in the plane direction is represented by $R_e$, a phase difference when the angle between incident light and the film side is 50° is represented by $R_\theta$, and a phase difference between the film thickness direction and the y-axis in the plane is represented by $R_{th}$.

$$R_{th} = \frac{R_\theta \times \cos\theta_f}{\sin^2\theta_f} \quad \langle\text{Mathematical Equation 1}\rangle$$

In the Mathematical Equation 1, $R_{th}$ denotes a phase difference in the thickness direction, and $\theta_f$ denotes an internal angle.

(2) Measurement of Light Transmittance

The light transmittance of each base film obtained in the examples and comparative examples was measured using a haze meter.

(3) Measurement of Haze

The haze of each base film obtained in the examples and comparative examples was measured using a haze meter.

(4) Measurement of Refractive Index

The refractive index of each base film obtained in the examples and comparative examples was measured using a prism coupler.

(5) Measurement of Glass Transition Temperature

The glass transition temperature of each base film obtained in the examples and comparative examples was measured using a TMA (thermal mechanical analyzer), wherein the on-set point of the film according to temperature was confirmed.

TABLE 2

|  | thickness (µm) | Light transmittance (%) | $R_e$ (nm) | $R_{th}$ (nm) | $R_{th}$ (nm/µm) | Haze (%) | Refractive index | Tg (° C.) |
|---|---|---|---|---|---|---|---|---|
| Example 1 | 50 | 92 | 0.1 | −153 | −3.06 | 0.1 | 1.54 | 313 |
| Example 2 | 49 | 92 | 0 | −50 | −1.02 | 0.1 | 1.55 | 310 |
| Example 3 | 51 | 91 | 0 | −120 | −2.35 | 0.2 | 1.54 | 311 |
| Example 4 | 52 | 92 | 0 | −96 | −1.84 | 0.1 | 1.54 | 307 |
| Example 5 | 50 | 92 | 0 | −43 | −0.86 | 0.1 | 1.54 | 262 |
| Comparative Example 1 | 50 | 30 | — | — | — | 83 | — | 210 |
| Comparative Example 2 | 50 | 29 | — | — | — | 91 | — | 179 |

As shown in Table 2, Examples 1 to 4 including a polymer having a cyclic olefin-based repeat unit with the content of exo-isomers of 50% or more exhibited light transmittance of 90% or more, while the base film prepared in Comparative Example 1 having a small content of exo-isomers had low solubility to the solvent, and thus the film was opaque and exhibited remarkably low light transmittance of 30% or less compared to the examples. The phase difference and the refractive index of the films of the comparative examples could not be measured because the transparencies of the films were too low.

Further, the base film prepared in the examples exhibited a low phase difference in the thickness direction ($R_{th}$) per unit μm, and thus it can be applied for a base film of the inside as well as the outside, when used for a display device.

Experimental Example 2: Assessment of Adhesive Strength

The base films prepared in Example 1 and Comparative Example 1 were respectively coated on a COP, and then the adhesive strength was tested by attaching a 3M tape to the base film and instantaneously detaching it, and then confirming the state of the film.

Figure 1:
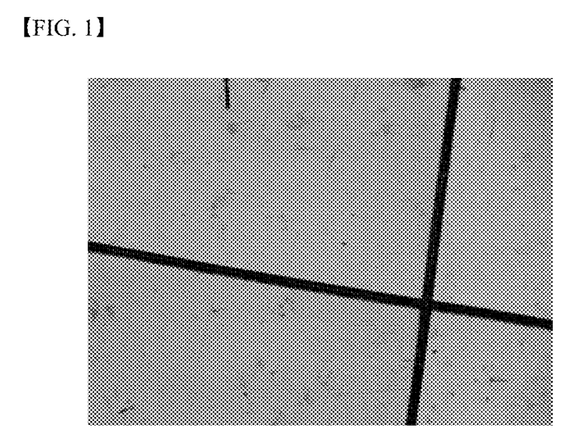
FIG. 1 is a photograph showing an assessment result of adhesive strength of the base film prepared according to Example 1.
Figure 2:
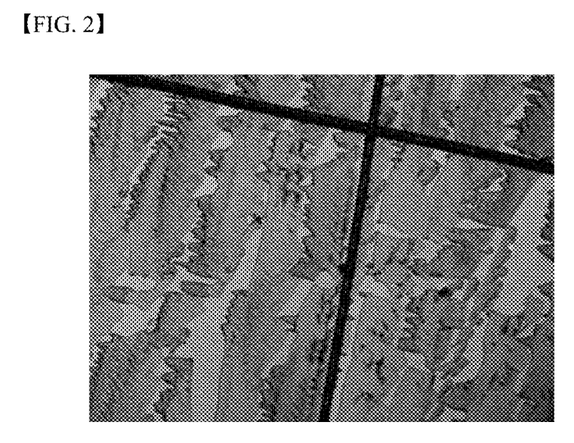
FIG. 2 is a photograph showing an assessment result of adhesive strength of the base film prepared according to Comparative Example 1.

The photographs of the base films of Example 1 and Comparative Example 1 after the adhesion test are respectively shown in FIG. 1 and FIG. 2.

Referring to FIG. 1, the base films including a polymer having a cyclic olefin-based repeat unit with the exo-isomer content of 50 mol % or more according to the examples of the present invention were hardly delaminated in the adhesion test, thus exhibiting good adhesive strength.

To the contrary, referring to FIG. 2, in the base films with the exo-isomer content of less than 50 mol % according to comparative examples, a lot delamination of the base film from the COP film occurred, thus exhibiting inferior adhesive strength.

The invention claimed is:
1. A laminate structure comprising:
a base film; and
a transparent metal oxide-based conductive film formed on the base film,
wherein the base film comprises:
a polymer having a cyclic olefin-based repeat unit; and
a copolymer including a styrene-based repeat unit and a maleimide-based repeat unit,
wherein the content of exo-isomers in the cyclic olefin-based repeat unit is 50 mol % or more,
wherein the polymer having a cyclic olefin-based repeat unit is a homopolymer prepared by addition polymerization of one kind of norbornene-based monomers represented by Chemical Formula 2, or a copolymer prepared by addition polymerization of two or more kinds thereof,
wherein, in the base film, a weight ratio of the polymer having a cyclic olefin-based repeat unit and the copolymer including a styrene-based repeat unit and a maleimide-based repeat unit is 90:10 to 70:30,
wherein the base film has a glass transition temperature of 300 to about 350° C., and
wherein the transparent metal oxide-based conductive film is at least one selected from the group consisting of an ITO film, an ATO film, an IZO (indium zinc oxide) film, a tin oxide film, a zinc oxide film, a titanium oxide film, and an antimony oxide film:

[Chemical Formula 2]

wherein, in the Chemical Formula 2,
q is an integer of 0 to 4,
R1 to R4 are independently a polar functional group or a non-polar functional group, or
at least one combination selected from the group consisting of R1 and R2, and R3 and R4, may be connected to each other to form a C1-10 alkylidene group, or R1 or R2 may be connected with one of R3 and R4 to form a C4-12 saturated or an unsaturated aliphatic ring or a C6-24 aromatic ring.

2. The laminate structure according to claim 1, wherein the polymer having a cyclic olefin-based repeat unit has a weight average molecular weight of 10,000 to 1,000,000.

3. The laminate structure according to claim 1, wherein the copolymer including a styrene-based repeat unit and a maleimide-based repeat unit includes 1 to 50 wt % of the styrene-based repeat unit.

4. The laminate structure according to claim 1, wherein the copolymer including a styrene-based repeat unit and a maleimide-based repeat unit has a weight average molecular weight of 500 to 1,000,000.

5. The laminate structure according to claim 1, wherein the non-polar functional group is selected from the group consisting of hydrogen; a halogen; a substituted or unsubstituted C1-20 linear or branched alkyl; a substituted or unsubstituted C2-20 linear or branched alkenyl; a substituted or unsubstituted C2-20 linear or branched alkynyl; a substituted or unsubstituted C3-12 cycloalkyl; a C6-40 aryl; and a substituted or unsubstituted C7-15 aralkyl.

6. The laminate structure according to claim 1, wherein the polar functional group is selected from the group consisting of —$R_5OR_6$, —$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_{50})_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$, in the polar functional group, p is independently an integer of 1 to 10;

R5 is selected from the group consisting of a substituted or unsubstituted C1-20 linear or branched alkylene, a substituted or unsubstituted C2-20 linear or branched alkenylene, a substituted or unsubstituted C2-20 linear or branched alkynylene, a substituted or unsubstituted C3-12 cycloalkylene, a substituted or unsubstituted C6-40 arylene, a substituted or unsubstituted C7-15 aralkylene, a substituted or unsubstituted C1-20 alkoxylene, and a substituted or unsubstituted C1-20 carbonyloxylene; and R6, R7, and R8 are independently selected from the group consisting of hydrogen, a halogen a substituted or unsubstituted C1-20 linear or branched alkyl, a substituted or unsubstituted C2-20 linear or branched alkenyl, a substituted or unsubstituted C2-20 linear or branched alkynyl, a substituted or unsubstituted C3-12 cycloalkyl, a substituted or unsubstituted C6-40 aryl, a substituted or unsubstituted C7-15 aralkyl, a substituted or unsubstituted C1-20 alkoxy, and a substituted or unsubstituted C1-20 carbonyloxy.

7. The laminate structure according to claim 1, wherein the norbornene-based monomer represented by the Chemical Formula 2 includes at least one selected from the group consisting of a monomer containing a carboxylic acid alkylester functional group, a monomer containing a polar functional group, a monomer containing an acetate group, a monomer containing an alkyl group, and a monomer containing an aryl group.

8. The laminate structure according to claim 1, wherein the styrene-based repeat unit is a repeat unit derived from a compound selected from the group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, α-bromostyrene, 2-hydroxystyrene, and 4-hydroxystyrene.

9. The laminate structure according to claim 1, wherein the maleimide-based repeat unit is a repeat unit derived from a compound selected from the group consisting (R)-(+)-N-(1-phenylethyl)maleimide, (S)-(−)-N-(1-phenylethyl)maleimide, 1,1'-(methylenedi-4,1-phenylene)bis-maleimide, 1-(2-methoxy-5-methylphenyl)maleimide, 2,3-dibromo-N-methylmaleimide, 2,3-dibromomaleimide, 22,3-dichloro-N-phenylmaleimide, 2-methyl-N-phenylmaleimide, 4-dimethylaminophenylazophenyl-4'-maleimide, biotin-maleimide, bisindolylmaleimide I hydrochloride, bisindolylmaleimide II, bisindolylmaleimide IV, bisindolylmaleimide V, bisindolylmaleimide VII, bisindolylmaleimide VIII, acetate, bisindolylmaleimide X, hydrochloride, bisindolylmaleimide XI, fluorescein diacetate 5-maleimide, maleimide, N,N'-(o-phenylene)dimaleimide, N,N'-(p-phenylene)dimaleimide, N,N'-1,2-phenylenedimaleimide, N,N'-1,3-phenylenedimaleimide, N,N'-1,4-phenylenedimaleimide, N-(1-naphthyl)-maleimide, N-(1-pyrenyl)maleimide, N-(2,3-xylyl)maleimide, N-(2-aminoethyl)maleimide trifluoroacetate salt, N-(2-ethylphenyl)maleimide, N-(2-methoxyphenyl)maleimide, N-(3-fluoranthyl)maleimide, N-(3-methoxyphenyl)maleimide, N-(4-anilino-1-naphthyl)maleimide, N-(4-chlorophenyl)-maleimide, N-(4-ethylphenyl)maleimide, N-(4-fluorophenyl)maleimide, N-(4-iodophenyl)maleimide, N-(4-nitrophenyl)maleimide, N-(4-phenoxyphenyl)maleimide, N-(7-dimethylamino-4-methyl-3-coumarinyl)maleimide, N-(7-dimethylamino-4-methylcoumarin-3-yl)-maleimide), N-(9-acridinyl)maleimide, N-(ortho-tolyl)-maleimide, N-(para-tolyl)-maleimide, N-benzyl-2,3-dibromomaleimide, N-benzylmaleimide, N-butylmaleimide, N-cyclohexylmaleimide, N-ethylmaleimide, N-hydroxymaleimide, N-methoxycarbonylmaleimide, N-methylmaleimide, N-phenylmaleimide, N-propylmaleimide, N-tert-butylmaleimide, N-[4-(2-benzimidazolyl)phenyl]maleimide, and streptavidin-maleimide.

10. The laminate structure according to claim 1, wherein the base film has light transmittance of 90% or more at 400 to 800 nm.

11. The laminate structure according to claim 1, wherein the base film has a thickness of 20 to 200 μm.

12. The laminate structure according to claim 1, wherein the base film is a base of an ITO film for a touch panel or a base of a display device.

13. A display device comprising the laminated structure of claim 1.

* * * * *